US006582852B1

(12) United States Patent
Gao et al.

(10) Patent No.: US 6,582,852 B1
(45) Date of Patent: *Jun. 24, 2003

(54) METAL OXIDE CONTAINING MULTIPLE DOPANTS AND METHOD OF PREPARING SAME

(75) Inventors: Yuan Gao, Ocean, NJ (US); Marina Yakovleva, Gastonia, NC (US); Walter B. Ebner, Budd Lake, NJ (US)

(73) Assignee: FMC Corporation, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/580,088

(22) Filed: May 30, 2000

Related U.S. Application Data

(63) Continuation of application No. 08/954,372, filed on Oct. 20, 1997.
(60) Provisional application No. 60/046,570, filed on May 15, 1997, and provisional application No. 60/046,571, filed on May 15, 1997.

(51) Int. Cl.[7] .............................. H01M 4/48; H01M 4/52
(52) U.S. Cl. ............................... 429/231.1; 429/231.2; 429/231.3; 423/594
(58) Field of Search ........................... 429/218.1, 231.1, 429/231.2, 231.3; 423/594, 608, 641

(56) References Cited

U.S. PATENT DOCUMENTS 4,366,215 A   12/1982   Coetzer et al.

(List continued on next page.)

FOREIGN PATENT DOCUMENTS

DE         4435117        5/1996

(List continued on next page.)

OTHER PUBLICATIONS

*Thermal Stability of $Li_xCoO_2$, $Li_xNiO_2$ and $\lambda\text{-}MnO_2$ and Consequences For the Sagety of Li–ion Cells*, J. R. Dahn et al., Solid State Ionics 69 (1994), pp. 265–270.

(List continued on next page.)

Primary Examiner—Carol Chaney
(74) Attorney, Agent, or Firm—Myers Bigel Sibley & Sajovec, PA

(57) ABSTRACT

The present invention relates to metal oxides containing multiple dopants. The metal oxides have the formula:

$$LiM_{y-x}[A]_xO_z \text{ or } M_{y-x}[A]_xO_z,$$

wherein M is a transition metal, $$0 < x \leq y, \quad [A] = \sum_{i=1}^{n} w_i B_i$$

wherein $B_i$ is an element used to replace the transition metal M and $w_i$ is the fractional amount of element $B_i$ in the total dopant combination such that $$\sum_{i=1}^{n} w_i = 1,$$

n is the total number of dopant elements used and is a positive integer of two or more, wherein the fractional amount $w_i$ of dopant element $B_i$ is determined by the relationship $$\sum_{i=1}^{n} w_i E_i = \text{the oxidation state of the transition metal } M \pm 0.5,$$

$E_i$ is the oxidation state of dopant $B_i$ in the final product $LiM_{y-x}[A]_xO_z$ or $M_{y-x}[A]_xO_z$, the dopant elements $B_i$ are cations in the intercalation compound, and the ratio of Li to O in the intercalation compound is not smaller than the ratio of Li to O in the undoped compound $LiM_yO_z$ or $M_yO_z$. The present invention also includes methods of preparing same and specific embodiments of same.

8 Claims, 9 Drawing Sheets

U.S. PATENT DOCUMENTS

| | | | |
|---|---|---|---|
| 4,507,371 A | 3/1985 | Thackeray et al. | |
| 4,668,595 A | 5/1987 | Yoshino et al. | |
| 4,980,251 A | 12/1990 | Thackeray et al. | |
| 5,147,738 A | 9/1992 | Toyoguchi | |
| 5,153,081 A | 10/1992 | Thackeray et al. | |
| 5,160,712 A | 11/1992 | Thackeray et al. | |
| 5,166,012 A | 11/1992 | Rossouw et al. | |
| 5,169,736 A | 12/1992 | Bittihn et al. | |
| 5,240,794 A | 8/1993 | Thackeray et al. | |
| 5,264,201 A * | 11/1993 | Dahn et al. | 423/593 |
| 5,316,877 A | 5/1994 | Thackeray et al. | |
| 5,370,949 A | 12/1994 | Davidson et al. | |
| 5,425,932 A | 6/1995 | Tarascon | |
| 5,429,890 A | 7/1995 | Pynenburg et al. | |
| 5,478,671 A | 12/1995 | Idota | |
| 5,478,672 A | 12/1995 | Mitate | |
| 5,478,674 A | 12/1995 | Miyasaka | |
| 5,478,675 A | 12/1995 | Nagaura | |
| 5,518,842 A | 5/1996 | Fey et al. | |
| 5,595,842 A | 1/1997 | Nakane et al. | |
| 5,609,975 A | 3/1997 | Hasegawa et al. | |
| 5,620,812 A * | 4/1997 | Tahara et al. | 429/220 |
| 5,626,635 A | 5/1997 | Yamaura et al. | |
| 5,631,105 A | 5/1997 | Hasegawa et al. | |
| 5,658,693 A | 8/1997 | Thackeray et al. | |
| 5,672,329 A | 9/1997 | Okada et al. | |
| 5,674,645 A | 10/1997 | Amatucci et al. | |
| 5,677,087 A | 10/1997 | Amine et al. | |
| 5,686,203 A | 11/1997 | Idota et al. | |
| 5,718,989 A | 2/1998 | Aoki et al. | |
| 5,750,288 A | 5/1998 | Xie et al. | |
| 5,783,333 A | 7/1998 | Mayer | |
| 5,795,558 A | 8/1998 | Aoki et al. | |
| 5,866,279 A | 2/1999 | Wada et al. | |
| 6,017,654 A | 1/2000 | Kumta et al. | |
| 6,071,645 A * | 6/2000 | Biensan et al. | 429/223 |
| 6,277,521 B1 * | 8/2001 | Gao et al. | 429/218.1 |

FOREIGN PATENT DOCUMENTS

| | | |
|---|---|---|
| EP | 0 712 172 | 5/1996 |
| EP | 0 744 381 | 11/1996 |
| EP | 0 840 386 A1 | 5/1998 |
| GB | 2 270 195 | 3/1994 |
| JP | 6124707 | 5/1994 |
| JP | 6-227820 A | 8/1994 |
| JP | 7-114915 A | 5/1995 |
| JP | 07192721 A | 7/1995 |
| JP | 07192721 A2 | 7/1995 |
| JP | 8078004 A | 3/1996 |
| JP | 8138649 A | 5/1996 |
| JP | 8138669 A | 5/1996 |
| JP | 8-222220 A | 8/1996 |
| JP | 8250120 A | 9/1996 |
| JP | 08264179 A2 | 10/1996 |
| JP | 8287914 A | 11/1996 |
| JP | 09007638 A2 | 1/1997 |
| JP | 9-092285 A | 4/1997 |
| JP | 9-306490 A | 11/1997 |
| JP | 10001316 A | 1/1998 |
| JP | 10027611 A2 | 1/1998 |
| JP | 10214624 A | 8/1998 |
| JP | 11513181 W | 11/1999 |
| WO | 98/02928 | 1/1998 |

OTHER PUBLICATIONS

*Synthesis and Characterization of $LiAl_{1/4}Ni_{3/4}O_2$ (R3m) for Lithium–Ion (Shuttlecock) Batteries*, T. Ohzuku et al., J. Electrochem. Soc., vol. 142, No. 12, Dec. 1995, pp. 4033–4039.

*Structure and Electrochemistry of $Li_xMn_yNi_{1-y}O_2$*, E. Rossen et al., Solid State Ionics 57, (1992), pp. 311–318.

*Lithium Manganese Cobalt Spinel Cathode for 4V Lithium Batteries*, B. Banov et al., 8th International Meeting on Lithium Batteries, Jun., 1996, pp. 452–453.

*Chemically Desodiated Thiochromites as Cathode Materials in Secondary Lithium Cells*, R. Moshtev et al., Journal of Power Sources, 26 (1989) pp. 285–292.

*Improved Capacity Retention In Rechargeable 4V Lithium/Lithium–Manganese Oxide (Spinel) Cells*, R. J. Gummow et al., Solid State Ionics 69 (1994).

*The Spinel Phase of $LiMn_2O_4$ As a Cathode in Secondary Lithium Cells*, J. M. Tarascon et al., J. Electrochem. Soc. vol. 138, No. 10, Oct. 1991 pp. 2859–2864.

*Ambient and High–Pressure Structures of $LiMnVo_4$ and Its $Mn^{3+}/Mn^{2+}$ Redox Energy*, A. K. Padhi et al., Journal of Solid State Chemistry 128 (1997), pp. 267–272.

*Preparation and Electrochemical Investigation of $LiMn_{1.5}Me_{0.5}O_4$ (Me:Ni,Fe) Cathode Materials for Secondary Lithium Batteries*, K. Amine et al., pp. 472–473.

*Preparation and Electrochemical Investigation of $LiMn_{2-x}Me_xO_4$ (Me:Ni,Fe, and x=0.5,1) Cathode Materials for Secondary Lithium Batteries*, K. Amine et al., Journal of Power Sources 68 (1997) pp. 604–608.

*Doped Li–Mn Spinels: Physical/Chemical Characteristics and Electrochemical Performances in Li Batteries*, G. Pistoia et al., Chem. Mater. 9 (1997), pp. 1443–1450.

*Valence Analysis of Transition Metal Ions in Spinel $LiMnMO_4$ (M=Ti, Cr, Mn, Co) By Electron Energy Loss Spectroscopy*, S. Suzuki et al., J. Phys. Chem. Solids vol. 57, No. 12. (1996) pp. 1851–1856.

*Structural Aspects of Lithium–Manganese–Oxide Electrodes For Rechargeable Lithium Batteries*; M. H. Rossouw et al., Material Research Bulletin, vol. 25, No. 2, pp. 173–182, (1990).

*Spinel Electrodes from the Li–Mn–O System for Rechargeable Lithium Battery Applications*; M. M. Thackeray et al., J. Electrochem. Soc., vol. 139, No. 2, pp. 363–366, (Feb. 1992).

A. DeKock et al., *The effect of multivalent cation dopants on lithium manganese spinel cathodes*, Journal of Power Sources 70 (1998) pp. 247–252. No month.

* cited by examiner

METAL OXIDE CONTAINING MULTIPLE DOPANTS AND METHOD OF PREPARING SAME

This application is a continuation of U.S. patent application Ser. No. 08/954,372, filed Oct. 20, 1997, and claims the benefit of U.S. Provisional Application Ser. No. 60/046,570, filed May 15, 1997, and U.S. Provisional Application Ser. No. 60/046,571, filed May 15, 1997, under 35 U.S.C. §119(e).

FIELD OF THE INVENTION

This invention relates to metal oxide compounds and to preparation methods thereof. More specifically, this invention relates to doped metal oxide insertion compounds for use in lithium and lithium-ion batteries.

BACKGROUND OF THE INVENTION

Metal oxides such as lithium metal oxides have found utility in various applications. For example, lithium metal oxides have been used as cathode materials in lithium secondary batteries. Lithium and lithium ion batteries can be used for large power applications such as for electric vehicles. In this specific application, lithium or lithium ion cells are put in series to form a module. In the event that one or more of the cells in the module fails, the rest of the cells become overcharged resulting possibly in explosion of the cells. Therefore, it is important that each cell is individually monitored and protected against overcharging.

The most attractive materials for use as cathode materials for lithium ion secondary batteries have been $LiCoO_2$, $LiNiO_2$, and $LiMn_2O_4$. However, although these cathode materials are attractive for use in lithium ion secondary batteries, there are definite drawbacks associated with these materials. One of the apparent benefits for using $LiNiO_2$ and $LiCoO_2$ as cathode materials is that those lithium metal oxides have a theoretical capacity of 275 mA·hr/g. Nevertheless, the full capacity of these materials cannot be achieved in practice. In fact, for pure $LiNiO_2$ and $LiCoO_2$, only about 140–150 mA·hr/g can be used. The further removal of lithium by further charging (overcharging) the $LiNiO_2$ and $LiCoO_2$ material degrades the cycleability of these materials by moving nickel or cobalt into the lithium layers. Furthermore, the further removal of lithium causes exothermic decomposition of the oxide in contact with the organic electrolyte under heated conditions which poses safety hazards. Therefore, lithium ion cells using $LiCoO_2$ or $LiNiO_2$ are typically overcharge protected.

$LiCoO_2$ and $LiNiO_2$ have additional disadvantages when used in lithium ion batteries. Specifically, $LiNiO_2$ raises safety concerns because it has a sharper exothermic reaction at a lower temperature than $LiCoO_2$. As a result, the charged end product, $NiO_2$, is unstable and can undergo an exothermic decomposition reaction releasing $O_2$ (Dahn et al, Solid State Ionics, Vol. 69, 265 (1994)). Accordingly, pure $LiNiO_2$ is generally not selected for use in commercial lithium-ion batteries. Additionally, cobalt is a relatively rare and expensive transition metal, which makes the positive electrode expensive.

Unlike $LiCoO_2$ and $LiNiO_2$, $LiMn_2O_4$ spinel is believed to be overcharge safe and is a desirable cathode material for that reason. Nevertheless, although cycling over the full capacity range for pure $LiMn_2O_4$ can be done safely, the specific capacity of $LiMn_2O_4$ is low. Specifically, the theoretical capacity of $LiMn_2O_4$ is only 148 mA·hr/g and typically no more than about 115–120 mA·hr/g can be obtained with good cycleability. The orthorhombic $LiMnO_2$ and the tetragonally distorted spinel $Li_2Mn_2O_4$ have the potential for larger capacities than is obtained with the $LiMn_2O_4$ spinel. However, cycling over the full capacity range for $LiMnO_2$ and $Li_2Mn_2O_4$ results in a rapid capacity fade.

Various attempts have been made to either improve the specific capacity or safety of the lithium metal oxides used in secondary lithium batteries. For example, in an attempt to improve the safety and/or specific capacity of these lithium metal oxides, these lithium metal oxides have been doped with other cations. For example, lithium and cobalt cations have been used in combination in lithium metal oxides. Nevertheless, although the resulting solid solution $LiNi_{1-x}Co_xO_2$ ($0 \leq X \leq 1$) may have somewhat improved safety characteristics over $LiNiO_2$ and larger useful capacity below 4.2 V versus Li than $LiCoO_2$, this solid solution still has to be overcharge protected just as $LiCoO_2$ and $LiNiO_2$.

One alternative has been to dope $LiNiO_2$ with ions that have no remaining valence electrons thereby forcing the material into an insulator state at a certain point of charge, and therefore protecting the material from overcharge. For example, Ohzuku et al (Journal of Electrochemical Soc., Vol. 142, 4033 (1995)) describe that the use of $Al^{3+}$ as a dopant for lithium nickelates ($LiNi_{0.75}Al_{0.25}O_4$) can produce improved overcharge protection and thermal stability in the fully charged state as compared to $LiNiO_2$. However, the cycle life performance of this material is unknown. Alternatively, U.S. Pat. No. 5,595,842 to Nakare et al. demonstrates the use of $Ga^{3+}$ instead of $Al^{3+}$. In another example, Davidson et al (U.S. Pat. No. 5,370,949) demonstrates that introducing chromium cations into $LiMnO_2$ can produce a tetragonally distorted spinel type of structure which is air stable and has good reversibility on cycling in lithium cells.

Although doping lithium metal oxides with single dopants has been successful in improving these materials, the choice of single dopants which can be used to replace the metal in the lithium metal oxide is limited by many factors. For example, the dopant ion has to have the right electron configuration in addition to having the right valency. For example, $Co^{3+}$, $Al^{3+}$, and $Ga^{3+}$ all have the same valency but $Co^{3+}$ can be oxidized to $Co^{4+}$ while $Al^{3+}$, and $Ga^{3+}$ cannot. Therefore doping $LiNiO_2$ with Al or Ga can produce overcharge protection while doping with cobalt does not have the same effect. The dopant ions also have to reside at the correct sites in the structure. Rossen et al (Solid State Ionics Vol. 57, 311 (1992)) shows that introducing Mn into $LiNiO_2$ promotes cation mixing and therefore has a detrimental effect on performance. Furthermore, one has to consider the ease at which the doping reaction can be carried out, the cost of the dopants, and the toxicity of the dopants. All of these factors further limit the choice of single dopants.

SUMMARY OF THE INVENTION

The present invention uses multiple dopants to replace the transition metal M in lithium metal oxides and metal oxides having the formula $LiM_yO_z$ or $M_yO_z$ to have a collective effect on these intercalation compounds. As a result, the choice of dopants is not limited to elements having the same valency or site preference in the structure as the transition metal M, to elements having only a desired electron configuration, and to elements having the ability to diffuse into $LiM_yO_z$ or $M_yO_z$ under practical conditions. The use of a carefully chosen combination of multiple dopants widens the choices of dopants which can be used in the intercalation compounds and also can bring about more beneficial effects than a single dopant. For example, the use of multiple dopants can result in better specific capacity, cycleability, stability, handling properties and/or cost than has been achieved in single dopant metal oxides. The doped intercalation compounds of the invention can be used as cathode materials in electrochemical cells for lithium and lithium-ion batteries.

The doped lithium metal oxides and doped metal oxides of the invention have the formula:

$$LiM_{y-x}[A]_xO_z \text{ or } M_{y-x}[A]_xO_z$$

wherein M is a transition metal, $$0 < x \leq y, \ [A] = \sum_{i=1}^{n} w_iB_i$$

wherein $B_i$ is an element used to replace the transition metal M and $w_i$ is the fractional amount of element $B_i$ in the total dopant combination such that $$\sum_{i=1}^{n} w_i = 1,$$

n is the total number of dopant elements used and is a positive integer of two or more, the fractional amount $w_i$ of dopant element $B_i$ is determined by the relationship $$\sum_{i=1}^{n} w_iE_i = \text{the oxidation state of the replaced transition metal } M \pm 0.5,$$

$E_i$ is the oxidation state of dopant $B_i$ in the final product $LiM_{y-x}[A]_xO_z$ or $M_{y-x}[A]_xO_z$, the dopant elements $B_i$ are cations in the intercalation compound, and the ratio of Li to O in the doped intercalation compound is not smaller than the ratio of Li to O in the undoped compound $LiM_yO_z$ or $M_yO_z$. Typically, M is selected from Co, Ni, Mn, Ti, Fe, V and Mo and the dopant elements $B_i$ are any elements other than M having a Pauling's electronegativity not greater than 2.05 or Mo.

In one preferred embodiment of the invention, the intercalation compound has a formula $LiM_{y-x}[A]_xO_z$ wherein M is Ni or Co and the dopant elements $B_i$ include $Ti^{4+}$ and $Mg^{2+}$. The formulas $LiNi_{1-x}Ti_aMg_bO_2$ and $LiCo_{1-x}Ti_aMg_bO_2$ can also be used to describe these intercalation compounds wherein x=a+b and x is preferably in the range from greater than 0 to about 0.5. More preferably, a is approximately equal to b and b is no smaller than a for these intercalation compounds. The dopant elements $B_i$ can further include other cations or have the formula $LiM_{y-x}[A]_xO_z$ wherein M is Ni or Co, y=1, z=2, and the dopant elements $B_i$ include $Ti^{4+}$, $Mg^{2+}$ and $Li^+$ cations.

The present invention also includes a method of preparing a doped intercalation compound having the formula $LiM_{y-x}[A]_xO_z$ or $M_{y-x}[A]_xO_z$. Source compounds containing M, [A] and optionally Li are mixed to provide a stoichiometric relationship between M, [A] and Li corresponding to the formula $LiM_{y-x}[A]_xO_z$ or $M_{y-x}[A]_xO_z$, wherein M is a transition metal, $$0 < x \leq y, \ [A] = \sum_{i=1}^{n} w_iB_i$$

wherein $B_i$ is an element used to replace the transition metal M and $w_i$ is the fractional amount of element $B_i$ in the total dopant combination, n is the total number of dopant elements used and is a positive integer of two or more, the fractional amount $w_i$ of dopant element $B_i$ is determined by the relationship:

$$\sum_{i=1}^{n} w_iE_i = \text{the oxidation state of the transition metal } M \pm 0.5,$$

$E_i$ is the oxidation state of dopant $B_i$ in the final product $LiM_{y-x}[A]_xO_z$ or $M_{y-x}[A]_xO_z$, the dopant elements $B_i$ are selected to be cations in the intercalation compound, and the ratio of Li to O in the doped intercalation compound is not smaller than the ratio of $L_i$ to O in the undoped compound $LiM_4O_2$ or $M_yO_z$. The cations for the intercalation compound can each be supplied from separate source compounds or two or more of the cations can be supplied from the same source compounds. The mixture of source compounds is fired at a temperature between 500° C. and 1000° C. in the presence of oxygen to produce the intercalation compound and preferably cooled in a controlled manner to produce a doped intercalation compound suitable for use as a cathode material for electrochemical cells for lithium and lithium-ion batteries.

These and other features and advantages of the present invention will become more readily apparent to those skilled in the art upon consideration of the following detailed description which describes both the preferred and alternative embodiments of the present invention.

DETAILED DESCRIPTION OF THE PREFERRED EMBODIMENTS

Figure 1:
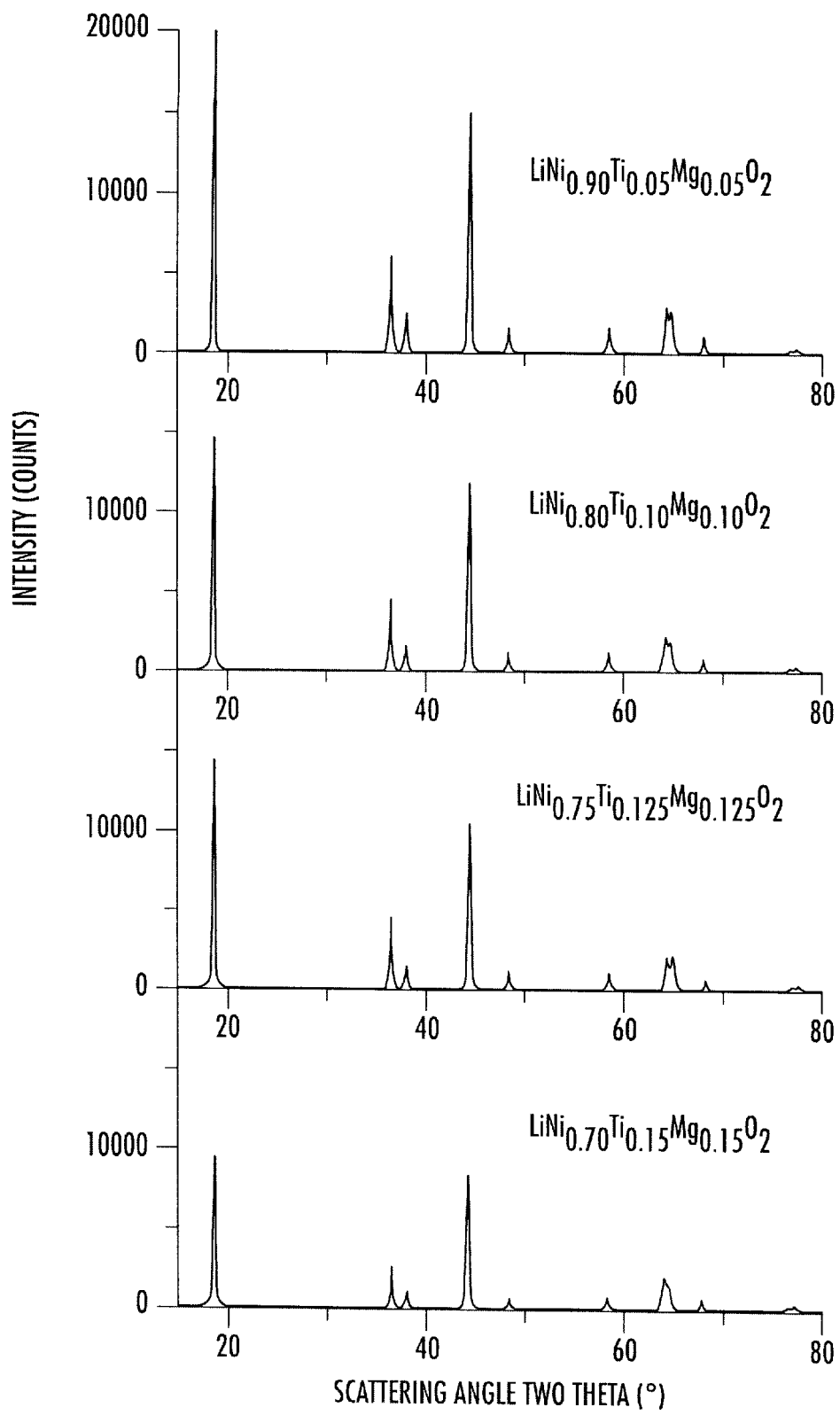
FIG. 1 is an x-ray diffraction pattern study for four different intercalation compounds produced according to the present invention.

The present invention will be described more fully hereinafter with reference to the accompanying drawings, in which preferred embodiments of the invention are shown. This invention can, however, be embodied in many different forms and should not be construed as limited to the embodiments set forth herein; rather, these embodiments are provided so that this disclosure will be thorough and complete, and will fully convey the scope of the invention to those skilled in the art. In the following description, the invention is described primarily with respect to $LiNiO_2$. Nevertheless, the present invention should not be limited thereto and can be used with various intercalation compounds including a wide range of lithium metal oxides and metal oxides including, e.g., $LiMnO_2$, $LiCoO_2$, $Li_2Mn_2O_4$, $LiMn_2O_4$, $MnO_2$, and $V_2O_5$.

The doped lithium metal oxides and doped metal oxides of the invention have the formula:

$$LiM_{y-x}[A]_xO_z \text{ or } M_{y-x}[A]_xO_z,$$

wherein M is a transition metal, $0 < x \leq y$, $$[A] = \sum_{i=1}^{n} w_i B_i$$

wherein $B_i$ is an element used to replace the transition metal M and $w_i$ is the fractional amount of element $B_i$ in the total dopant combination and therefore $$\sum_{i=1}^{n} w_i = 1,$$

n is the total number of dopant elements used and is a positive integer of two or more, wherein the fractional amount $w_i$ of dopant element $B_i$ is determined by the relationship $$\sum_{i=1}^{n} w_i E_i = \text{the oxidation state of the transition metal } M \pm 0.5,$$

$E_i$ is the oxidation state of dopant $B_i$ in the final product $LiM_{y-x}[A]_xO_z$ or $M_{y-x}[A]_xO_z$, the dopant elements $B_i$ are cations in the intercalation compound, and the ratio of Li to O in the intercalation compound is not smaller than the ratio of Li to O in the undoped compound $LiM_yO_z$ or $M_yO_z$.

The doped lithium metal oxide and doped metal oxide compounds of the invention can be described as intercalation or insertion compounds. The preferred doped metal oxide compound is a lithium metal oxide intercalation compound having the formula $LiM_{y-x}[A]_xO_z$. In the intercalation compounds of the invention, M is typically selected from Co, Ni, Mn, Ti, Fe, V and Mo. The dopant elements $B_i$ are any elements other than M having a Pauling's electronegativity not greater than 2.05 or Mo (i.e., if M is not Mo). In other words, the dopant elements $B_i$ are elements other than M selected to be cations in the intercalation compound. The dopant elements $B_i$ preferably include no more than one element from the Groups IIIB and IVB (e.g. Al and Si). Furthermore, the dopant elements $B_i$ are selected so that $$\sum_{i=1}^{n} w_i E_i$$

preferably approaches the oxidation state of the transition metal M and more preferably is equal to the oxidation state of the transition metal M in the undoped metal oxide $LiM_yO_z$ or $M_yO_z$.

The molar quantity of oxygen, z, in the intercalation compounds of the invention is such that the metal oxide is a stable, single phase metal oxide compound. Furthermore, as described above, the molar quantity of oxygen is such that the ratio of Li to O in the doped intercalation compound is not smaller than the ratio of Li to O in the undoped compound $LiM_yO_z$ or $M_yO_z$. Accordingly, the transition metal M is replaced with the dopant ions and the lithium is not substituted to maximize the specific capacity of the intercalation compound.

Various combinations of multiple dopants can be used according to the present invention in place of single dopants used in conventional intercalation compounds having the formula $LiM_{y-x}A_xO_z$ or $M_{y-z}A_xO_z$. For example, in $LiNi_{1-xAx}O_2$ intercalation compounds, the dopants $Al^{3+}$ and $Ga^{3+}$, conventionally described to replace $Ni^{3+}$, can be replaced with $0.5Ti^{4+}+0.5Mg^{2+}$ and still maintain the same charge balance in the compound. Instead of having $$LiNi^{3+}_{1-x}Al^{3+}_xO_2,$$

one has $$LiNi^{3+}_{1-x}Ti^{4+}_{x/2}Mg^{2+}_{x/2}O_2.$$

Since it is believed that $Ni^{3+}$ can only be oxidized to $Ni^{4+}$, only $(1-x)$ Li per formula unit can be removed. Like $Al^{3+}$ and $Ga^{3+}$, both $Ti^{4+}$ and $Mg^{2+}$ have no remaining valence electrons. Therefore, when the material composition reaches $$Li_xNi^{4+}_{1-x}Ti^{4+}_{x/2}Mg^{2+}_{x/2}O_2,$$

no more lithium can be removed and the voltage will simply increase sharply. Thus overcharge protection is achieved. In addition, $Ti^{4+}$ and $Mg^{2+}$ bind with oxygen more strongly than $Ni^{4+}$ and therefore $$Li_xNi^{4+}_{1-x}Ti^{4+}_{x/2}Mg^{2+}_{x/2}O_2$$

is more stable than $NiO_2$. Accordingly, single dopant $Al^{3+}$ or $Ga^{3+}$ or $Ni^{3+}$ itself in $LiNiO_2$ can be replaced by $[0.5Mg^{2+}+0.5Ti^{4+}]$ or even $[0.667Mg^{2+}+0.333V^{5+}]$ and other combinations of cations to achieve the overcharge protection and at the same time taking the benefit of the latter's larger binding energy with oxygen to achieve better material stability. Furthermore, $LiCoO_2$ can be doped in the manner described above with respect to $LiNiO_2$;

In one preferred embodiment of the invention, the intercalation compound has a formula $LiM_{y-x}[A]_xO_z$ wherein M is Ni or Co and the dopant elements $B_i$ include $Ti^{4+}$ and $Mg^{2+}$. The formulas $LiNi_{1-x}Ti_aMg_bO_2$ and $LiCo_{1-x}Ti_aMg_bO_2$ wherein x=a+b and x is preferably in the range from greater than 0 to about 0.5, can also be used to describe these intercalation compounds which have a hexagonal layered crystal structure. More preferably, a is approximately equal to b and b is no smaller than a for these intercalation compounds. It has been discovered that these materials, when used as the positive electrodes in lithium secondary electrochemical cells, have large specific capacities, are safer than $LiNiO_2$, and have good cycleabilities. The balance between having a large capacity and a thermally benign material can be achieved by adjusting x.

The use of Ti and Mg at the same time imposes intrinsic overcharge protection on the intercalation compounds and improves the safety of the material while maintaining good cycleability at large capacities. For example, it is believed that Ti and Mg have the form $Ti^{4+}$ and $Mg^{2+}$ in $LiNi_{1-x}Ti_yMg_zO_2$ because the energies of Mg 2s electrons are higher than Ti 3d electrons which in turn are higher than Ni 3d electrons (Yeh et al, Atomic Data and Nuclear Data Tables Vol. 32, 1–155 (1985)). It can be shown that the oxidation state of nickel equals 3 when a=b so that the material can be written as

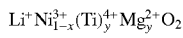

where y=x/2. Since there are no remaining valence electrons in either $Ti^{4+}$ or $Mg^{2+}$, only (1−x) Li per formula unit can be removed and therefore overcharge protection is achieved intrinsically. In other words, the charge will stop when all the $Ni^{3+}$ are oxidized to $Ni^{4+}$ and the fully charged material is

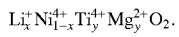

Also, the material is believed to be more stable against decomposition in the fully charged state than $LiNiO_2$. This is because $Ti^{4+}$ and $Mg^{2+}$ bind oxygen more strongly than $Ni^{4+}$, as evidenced by the fact that $TiO_2$ and MgO are very stable oxides and $NiO_2$ is not. This stability improves the safety of the material under overcharge conditions in lithium ion electrochemical cells. Because the average oxidation state of nickel is less than 3 in $LiNi_{1-x}Ti_aMg_bO_2$ when b<a, it is preferred that b≧a because $Ni^{2+}$ ions tend to migrate to the lithium layers, causing diffusion problems for lithium during electrochemical charge and discharge. Furthermore, it is preferred that b is not much greater than a because the oxidation state of nickel will approach 4 which makes it difficult to formulate single phase intercalation compounds. Therefore, the ratio of b:a is preferably between about 1 and about 1/x.

In the preferred embodiment described above, wherein M is Ni, the dopant elements $B_i$ can further include other cations such as cobalt cations. In addition, $Li^+$ ions can be used as a dopant with other dopants such as $Ti^{4+}$, either alone or in combination with $Mg^{2+}$. In other words, intercalation compounds can have the formula $LiM_{y-x}[A]_xO_z$ wherein M is Ni, y=1, z=2, and the dopant elements $B_i$ include $Ti^{4+}$ and $Li^+$ cations. In such an embodiment, the [$0.5Ti^{4+}$+0.5 $Mg^{2+}$] described in the preferred embodiment above can be replaced by [$0.667Ti^{4+}$+$0.333Li^+$]. Alternatively, the intercalation compound can also include $Mg^{2+}$ as a dopant such that the intercalation compound has a formula $LiM_{y-x}[A]_xO_z$ wherein M is Ni, y=1, z=2, and the dopant elements $B_i$ include $Ti^{4+}$, $Mg^{2+}$ and $Li^+$ cations. In such an embodiment, the [$0.5Ti^{4+}$+$0.5Mg^{2+}$] described in the preferred embodiment above can be replaced by [$0.6Ti^{4+}$+$0.2Mg^{2+}$+$0.2Li^+$]. As will be recognized by those skilled in the art, the above formulas can be altered when $Li^+$ is used as a dopant, e.g., $LiM_{y-x}Ti_{0.6x}Mg_{0.2x}Li_{0.2x}O_z$ can also be written as $Li_{1+0.2x}M_{y-x}Ti_{0.6x}Mg_{0.2x}O_z$ for the latter example.

The present invention can also be applied to many other types of lithium metal oxide and metal oxide cathode materials. For instance, one can replace $Mn^{4+}$ with $0.4Li^+$+$0.6Mo^{6+}$ or $0.25Li^++0.75V^{5+}$ in $LiMn_2O_4$ so that more $Li^+$ ions can be introduced into the octahedral 16d sites to improve the structural stability without causing significant capacity decrease.

The present invention also includes a method of preparing a doped intercalation compound having the formula $LiM_{y-x}[A]_xO_z$ or $M_{y-x}[A]_xO_z$. Source compounds or raw materials containing M, [A] and optionally Li are mixed to provide a stoichiometric relationship between M, [A] and Li corresponding to the formula $LiM_{y-x}[A]_xO_z$ or $M_{y-x}[A]_xO_z$, wherein M is a transition metal, $$0 < x \le y, \quad [A] = \sum_{i=1}^{n} w_i B_i$$

wherein $B_i$ is an element used to replace the transition metal M and $w_i$ is the fractional amount of element $B_i$ in the total dopant combination, n is the total number of dopant elements used and is a positive integer of two or more, the fractional amount $w_i$ of dopant element $B_i$ is determined by the relationship:

$$\sum_{i=1}^{n} w_i E_i = \text{the oxidation state of the transition metal } M \pm 0.5,$$

$E_i$ is the oxidation state of dopant $B_i$ in the final product $LiM_{y-x}[A]_xO_z$ or $M_{y-x}[A]_xO_z$, the dopant elements $B_i$ are selected to be cations in the doped intercalation compound, and the ratio of Li to O in the doped intercalation compound is not smaller than the ratio of Li to O in the undoped compound $LiM_yO_z$ or $M_yO_z$. The source compounds (raw materials) can be the pure elements but are typically compounds containing the elements such as oxides or salts thereof. The cations for the intercalation compound can each be supplied from separate source compounds or two or more of the cations can be supplied from the same source compounds. In addition, the source compounds can be mixed in any desirable order.

Although the intercalation compounds are preferably prepared by a solid state reactions, it can be advantageous to react the raw materials using wet chemistry such as sol-gel type reactions, alone or in combination with solid state reactions. For example, the source compounds comprising M and [A] can be prepared as a solution in a solvent such as water and the M and [A] precipitated out of solution to produce an intimately mixed hydroxide. The mixed hydroxide can then be blended with a lithium source compound. Typically, the selection of reaction methods will vary depending on the raw materials used and the desired end product.

The mixture once prepared can be reacted to form the lithium metal oxide or metal oxide. Preferably, the mixture is reacted by firing the mixture at an elevated temperature between 500° C. and 1000° C. in the presence of oxygen, e.g., between about 700° C. and 900° C., in a solid state reaction to produce the intercalation compounds. Once the mixture has been fired to form the doped lithium metal oxide or metal oxide intercalation compound, the intercalation compound is preferably cooled in a controlled manner to produce an intercalation compound suitable for use as a cathode material for electrochemical cells for lithium and lithium-ion batteries.

In the preferred embodiment described above having the formula $LiNi_{1-x}Ti_aMg_bO_2$ or $LiCo_{1-x}Ti_aMg_bO_2$, a single phase can be obtained by the following steps. First, stoichiometric amounts of a lithium source compound, a nickel or cobalt source compound, a titanium source compound and a magnesium source compound are mixed in any desired order to give the desired molar ratio according to the formula $LiNi_{1-x}Ti_yMg_zO_2$ or $LiCo_{1-x}Ti_aMg_bO_2$. As described above, the lithium, nickel (or cobalt), titanium and magnesium can be supplied by separate source compounds or two or more of these cations can be supplied by a single source compound. For example, $TiMgO_3$ and $Ni_{0.75}Ti_{0.25}O$ are commercially available compounds which can supply two cations for use in the intercalation compounds of the invention. The mixture is then fired at a temperature between 700° C. and 900° C., preferably between 750° C. and 850° C., in an atmosphere with a partial pressure of oxygen of at least 20 kPa, preferably about 100 kPa. The fired mixture is then cooled in a controlled manner, preferably at a rate of 5° C./min or less. The firing temperature and the soak times are chosen depending on x and the oxygen partial pressure so that the lithium to $Ni_{1-x}Ti_yMg_z$ ratio in the structure preferably approximates 1:1 and no significant cation mixing between lithium and the other metals occurs in the layers. Suitable compounds for the invention include a lithium source compound comprising one or any combination of the following: $LiOH$, $LiNO_3$, $Li_2CO_3$, $LiCl$ and $LiF$; a nickel source compound comprising one or any combination of the following: $NiO$, $Ni(NO_3)_2$, $Ni(OH)_2$ and $NiCO_3$; a cobalt source compound comprising one or any combination of the following: $Co_3O_4$, $Co(OH)_2$, $CoCO_3$, $Co(NO_3)_2$, $CoO$, and $Co_2O_3$; a titanium source compound comprising one or any combination of the following: a titanium source compound comprising $TiO_2$ in one or any combination of the following forms: anatase, rutile and brookite; and a magnesium source compound comprising one or any combination of the following: $Mg(OH)_2$, $Mg(NO)_3$, $MgCO_3$, $MgCl$ and $MgO$. Also, $TiMgO_3$ and $Ni_{0.75}Ti_{0.25}O$ can be used as source compounds as described above.

As mentioned above, in addition to producing the intercalation compounds of the invention by solid state methods, these compounds can also be made by wet chemistry methods. For example, Ni, Ti and Mg can be precipitated simultaneously from a solution containing the three resulting in an intimately mixed hydroxide. The mixed hydroxide having the desired molar ratio according to the formula $LiNi_{1-x}Ti_aMg_bO_2$ can then be blended with a lithium source compound and fired at a temperature of between 700° C. and 900° C. in an oxygen-containing atmosphere. In such wet chemistry reactions, it is not necessary to stay at high temperatures for extended periods of time in order for the Ti and Mg to diffuse uniformly with Ni.

The present invention will now be described according to the following non-limiting examples.

EXAMPLE 1

Stoichiometric amounts of $LiOH$, $NiO$, $TiO_2$, and $Mg(OH)_2$ are mixed and fired at a temperature of 800° C. for 20 hours in an atmosphere with the oxygen partial pressure close to 100 kPa. The cooling was controlled at 1° C./min down to 500° C. followed by natural cooling to room temperature. FIG. 1 shows the x-ray diffraction (XRD) patterns for 4 samples having the following formulas: $LiNi_{0.9}Ti_{0.05}Mg_{0.05}O_2$, $LiNi_{0.8}Ti_{0.1}Mg_{0.1}O_2$, $LiNi_{0.75}Ti_{0.125}Mg_{0.125}O_2$, and $LiNi_{0.7}Ti_{0.15}Mg_{0.15}O_2$. As shown in FIG. 1, each of these samples are in a single phase having a hexagonal layered structure. Samples were also made with nitrate precursors instead of hydroxides. The same single phase materials were obtained.

EXAMPLE 2

Figure 2:
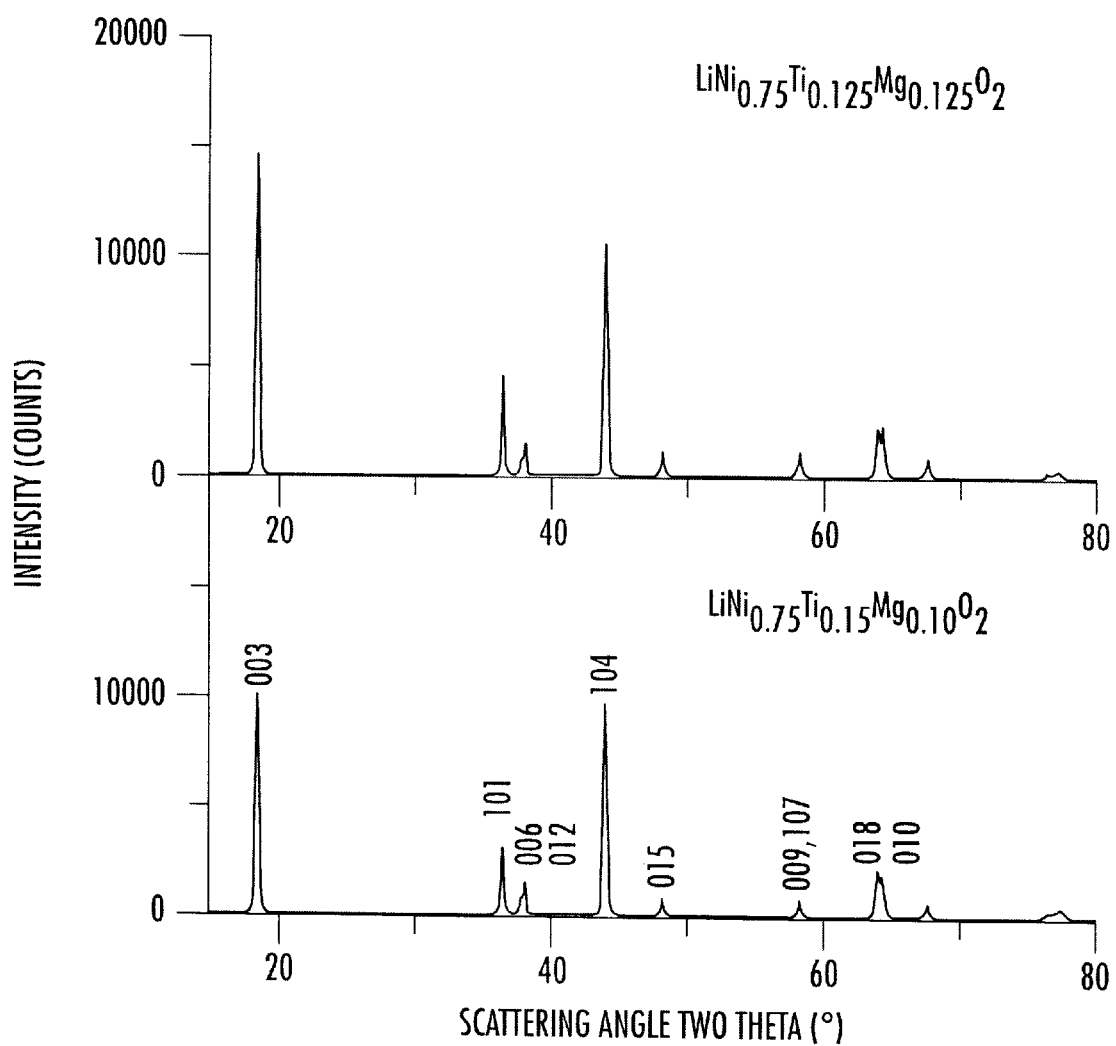
FIG. 2 is an x-ray diffraction pattern study for two different intercalation compounds produced according to the invention and demonstrating the desirability of maintaining valency in the intercalation compound.
Figure 3:
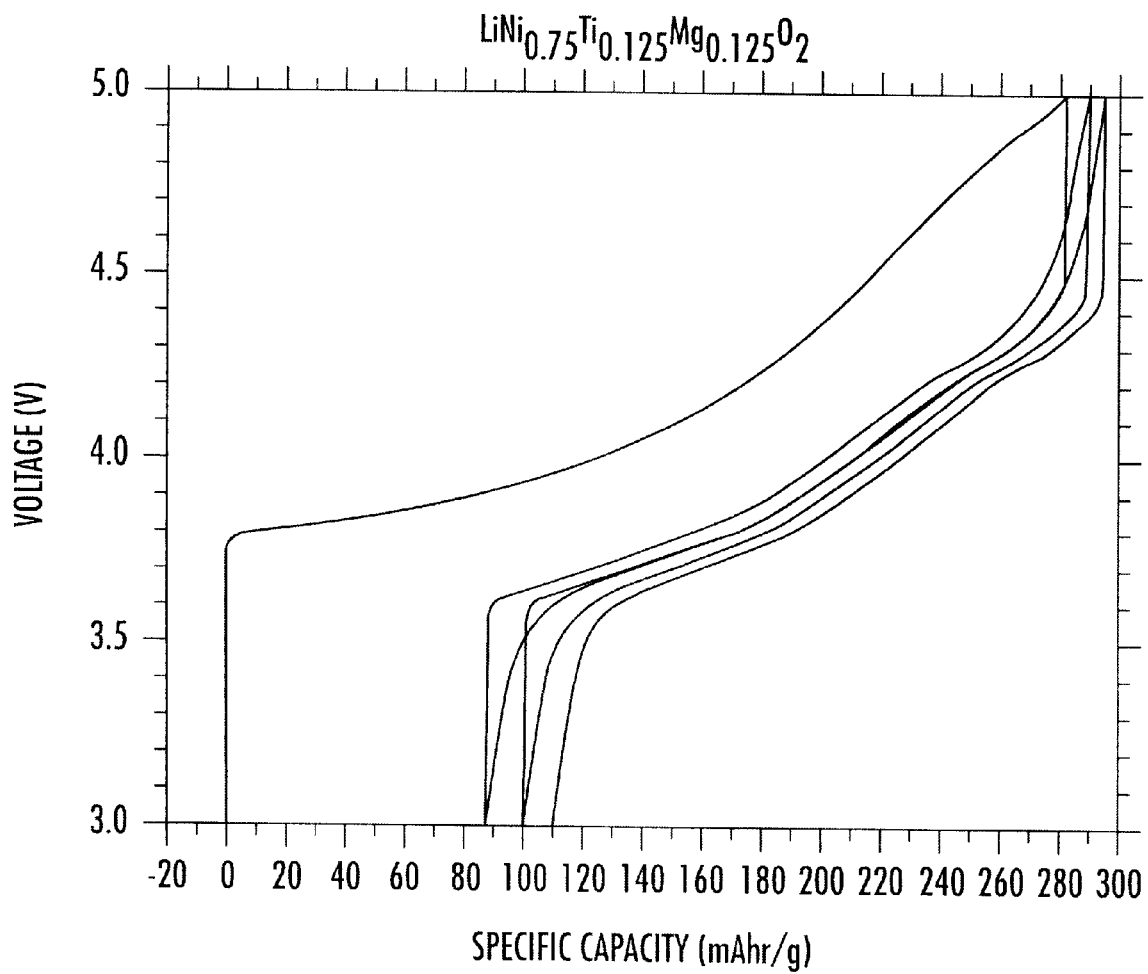
FIG. 3 is a voltage profile for three slow cycles between 3.0 V to 5.0 V for a fresh electrochemical cell containing an intercalation compound produced according to a preferred embodiment of the present invention.

A intercalation compound having the formula $LiNi_{0.75}Ti_{0.15}Mg_{0.10}O_2$ was prepared according to the method described in Example 1. The x-ray diffraction pattern for this sample is illustrated in FIG. 2 along with the x-ray diffraction pattern of the $LiNi_{0.75}Ti_{0.125}Mg_{0.125}O_2$ prepared in Example 1. As evidenced by the smaller peak ratio between the 003 peak and the 104 peak for $LiNi_{0.75}Ti_{0.15}Mg_{0.10}O_2$ as compared to $LiNi_{0.75}Ti_{0.125}Mg_{0.125}O_2$, there is a greater amount of cation mixing in the $LiNi_{0.75}Ti_{0.15}Mg_{0.10}O_2$ sample than in the $LiNi_{0.75}Ti_{0.125}Mg_{0.125}O_2$ sample. Therefore, it is important to maintain the amount of $Mg^{2+}$ greater than equal to the amount of $Ti^{4+}$ and preferably equal to the amount of $Ti^{4+}$.

EXAMPLE 3

Figure 4:
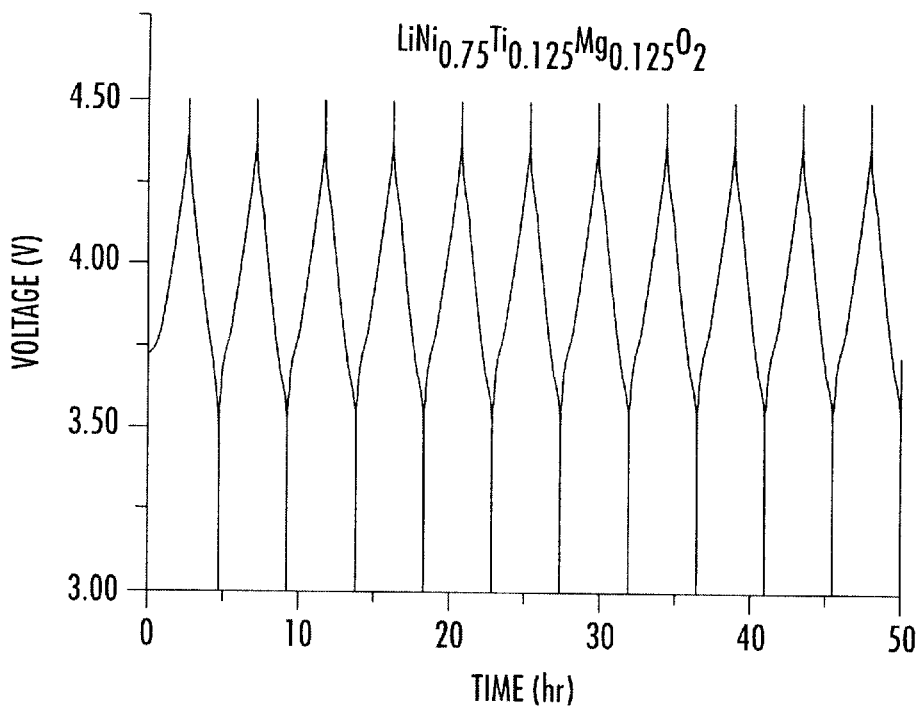
FIG. 4 is a voltage profile between 3.0 V and 4.5 V for the compound of FIG. 3 after the three slow cycles and demonstrating the cycleability of the compound.
Figure 5:
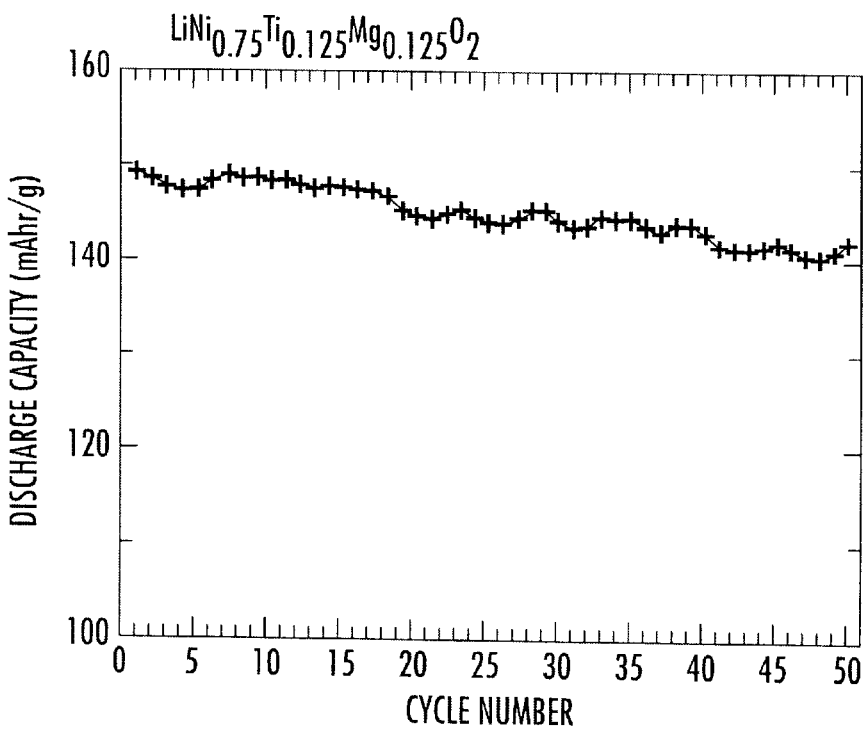
FIG. 5 is a graph of discharge capacity versus cycle number for the same compound as FIG. 4 and following the same cycling pattern as FIG. 4.
Figure 6:
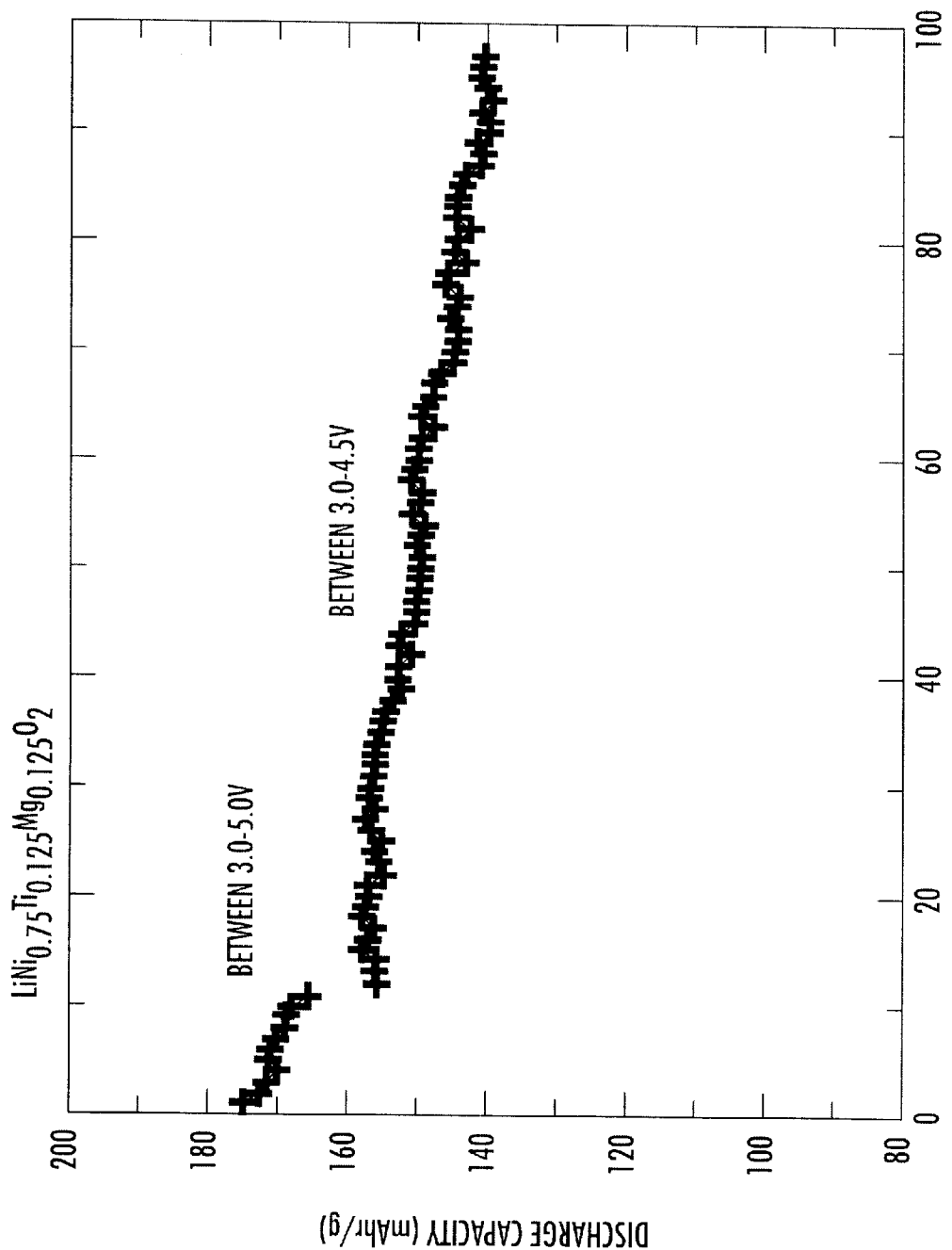
FIG. 6 is a graph of discharge capacity versus cycle number for an electrochemical cell containing the same intercalation compound tested in FIGS. 3–5 and following the same cycling pattern as in FIGS. 3–5.

Electrochemical cells with lithium metal as the anode and cathodes with $LiNi_{0.75}Ti_{0.125}Mg_{0.125}O_2$ (prepared according to Example 1) as the active material were made and tested. The electrolyte was 1M $LiPF_6$ in a 50/50 volume percent mixture of ethylene carbonate and dimethyl carbonate solvents. Celgard 3501 separators and NRC 2325 coin cell hardware were used. The cathode consisted of 85% active material (by weight), 10% super S™ carbon black (available from Chemetals) and 5% polyvinylidene fluoride (PVDF) as a binder polymer, coated on aluminum foil. Preliminary test results are shown in FIGS. 3–6. The cathode of test cell 1 contains 9.1 mg active mass of $LiNi_{0.75}Ti_{0.125}Mg_{0.125}O_2$. The cell was first cycled with 0.075 mA from 3.0 V to 5.0 V three times. The results of this cycling is illustrated in the voltage (V) to specific capacity (mA·hr/g) graph of FIG. 3. The current corresponds to a rate close to C/20 or 8.2 mA/g of active mass. After the first conditioning charge, the voltage curve of the subsequent cycles shows very reversible characteristics. As further shown in FIG. 3, most of the capacity is contained between 3.6 V and 4.4 V versus Li. Above 4.4 V, the voltage increases sharply to 5 V which shows very good overcharge characteristics. The reversible capacity is about 190 mA·hr/g. After the three slow cycles, the cell was cycled between 3.0 V and 4.5 V at a larger current of is 0.6 mA. This current corresponds to a faster rate of C/3 or 66 mA/g of active material. As shown in the voltage (V) to time (hr) graph of FIG. 4, very good reversibility was maintained and the polarization remained small at the higher charge/discharge rates. The discharge capacity versus cycle number for the 3.0–4.5 V cycling in FIG. 4 is shown in FIG. 5 which demonstrates the excellent cycleability of the material.

EXAMPLE 4

A second test cell (test cell 2) containing 16.2 mg active mass of $LiNi_{0.75}Ti_{0.125}Mg_{0.125}O_2$ was prepared. The cell was first cycled between 3.0 and 5.0 V for 11 cycles, and was then switched to 3.0–4.5 V cycling. The current for charge and discharge was 0.6 mA. As shown in the graph of discharge capacity versus cycle number in FIG. 6, the cycleability of the material was excellent.

EXAMPLE 5

Figure 7:
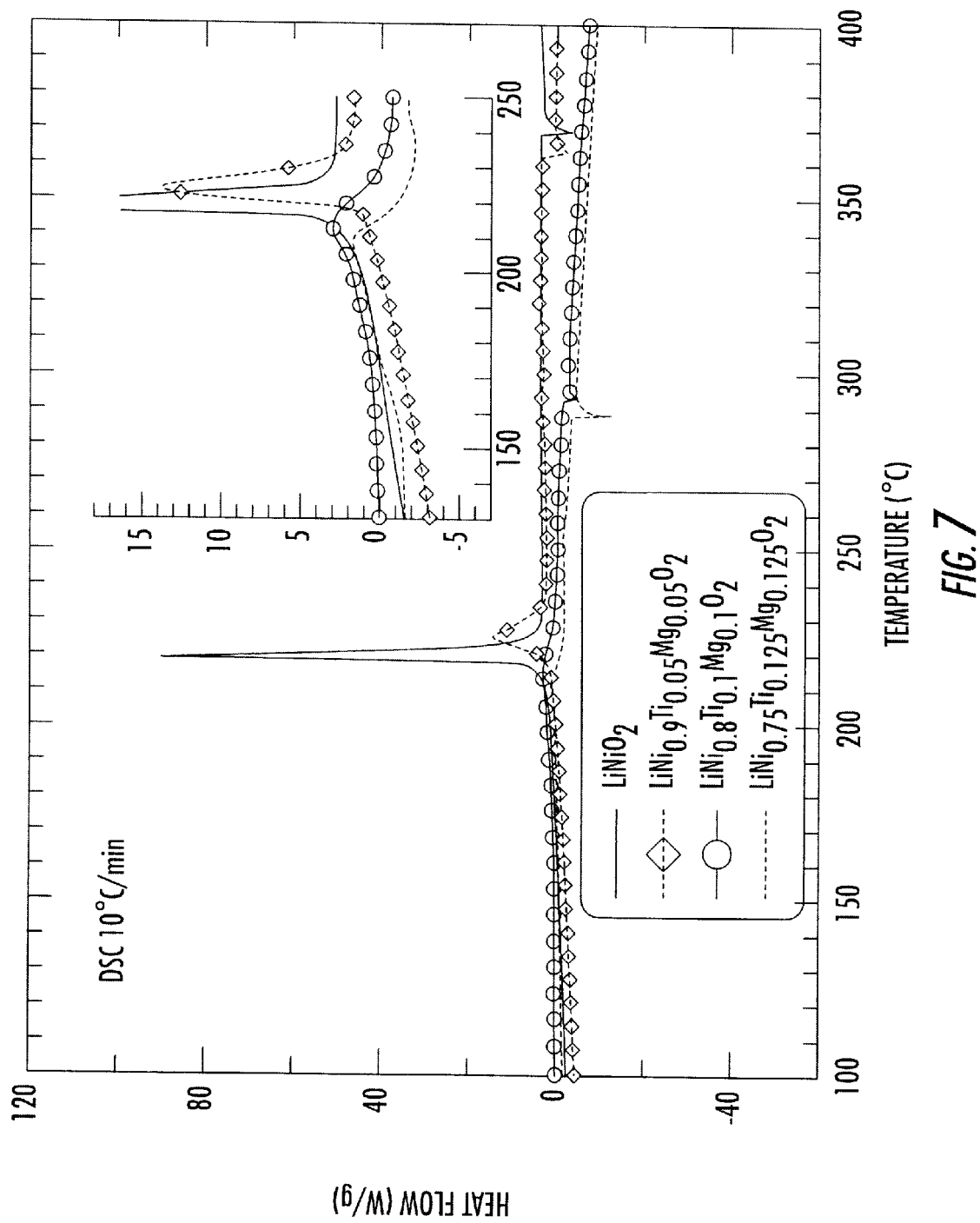
FIG. 7 is a differential scanning calorimetry (DSC) scan of three of the intercalation compounds tested in FIG. 1 and of $LiNiO_2$.

The $LiNi_{0.9}Ti_{0.05}Mg_{0.05}O_2$, $LiNi_{0.8}Ti_{0.1}Mg_{0.1}O_2$ and $LiNi_{0.75}Ti_{0.125}Mg_{0.125}O_2$ prepared in Example 1 were each used as the active cathode material for electrochemical cells prepared in the manner described in Example 3 using between 10 mg and 20 mg active material for each cell. The cells were first conditioning charged to 5.0 V and discharged to 3.0 V, and then float charged to 4.5 V with 0.2 mA current for 40 hours to ensure equilibrium conditions. The charged cells were then transferred to a glove box filled with argon and opened. Between 0.1 mg and 1.0 mg of the cathode material from the cells was removed and hermetically sealed into DSC cells. Each of cells contained 10–15% of the electrolyte described in Example 3. FIG. 7 illustrates the DSC results for the $LiNi_{0.9}Ti_{0.05}Mg_{0.05}O_2$, $LiNi_{0.8}Ti_{0.1}Mg_{0.1}O_2$ and $LiNi_{0.75}Ti_{0.125}Mg_{0.125}O_2$ with the area of interest magnified in the inset. The positive heat flow in FIG. 7 represent heat flowing out of the sample. As demonstrated in FIG. 7, the sharp exothermic peak at 220° C. decreases with increasing x for the formula $LiNi_{1-x}Ti_aMg_bO_2$ (x=a+b) demonstrating the thermal stability and safety advantage associated with the doped intercalation compounds.

EXAMPLE 6

Figure 8:
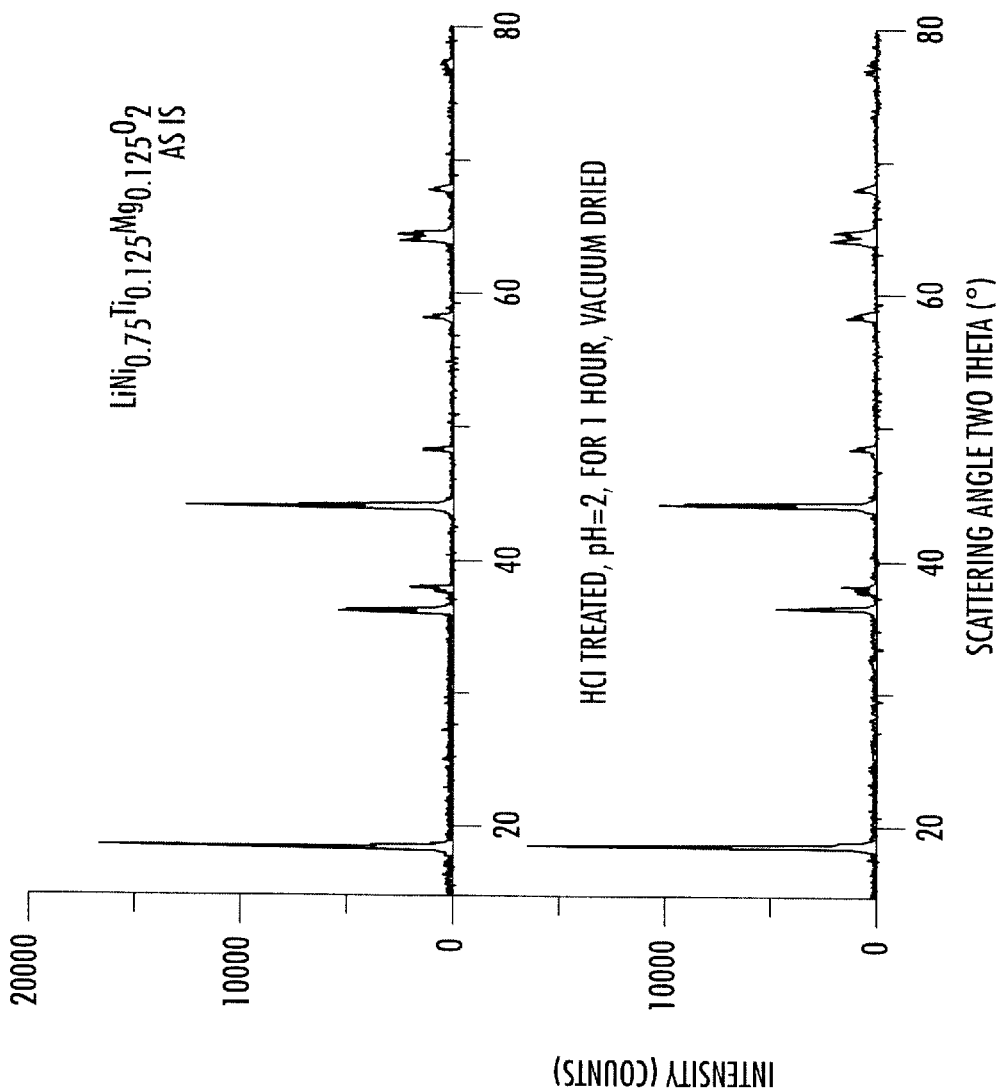
FIG. 8 is an x-ray diffraction pattern for an intercalation compound produced in accordance with the present invention both before and after acid treatment of the intercalation compound.

$LiNi_{0.75}Ti_{0.125}Mg_{0.125}O_2$ prepared as described in Example 1 was tested for acid resistance. Twenty grams of $LiNi_{0.75}Ti_{0.125}Mg_{0.125}O_2$ was placed in 400 ml deionized water. HCl was added until the pH of the solution reached 2 and the solution was stirred for 1 hour. The $LiNi_{0.75}Ti_{0.125}Mg_{0.125}O_2$ was filtered and washed with deionized water until the wash reached a pH of 7. The first liter of the wash was analyzed with inductively coupled plasma (ICP) spectroscopy. About 25% of the total lithium and less than 0.5% of the total Ni in the sample was detected in the wash. No Ti and Mg were detected in the wash. The washed and filtered $LiNi_{0.75}Ti_{0.125}Mg_{0.125}O_2$ was vacuum dried and an x-ray diffraction of this compound was performed. As shown in FIG. 8, the acid treated sample has the same XRD pattern as an untreated sample and the peaks are still sharp. Therefore, although there is partial delithiation (lithium leaching) under acidic conditions, the basic structural integrity of the material is still maintained as evidenced by the minimal loss of the transition metals and the XRD pattern showing the same structure and crystallinity of the intercalation compound.

EXAMPLE 7

Figure 9:
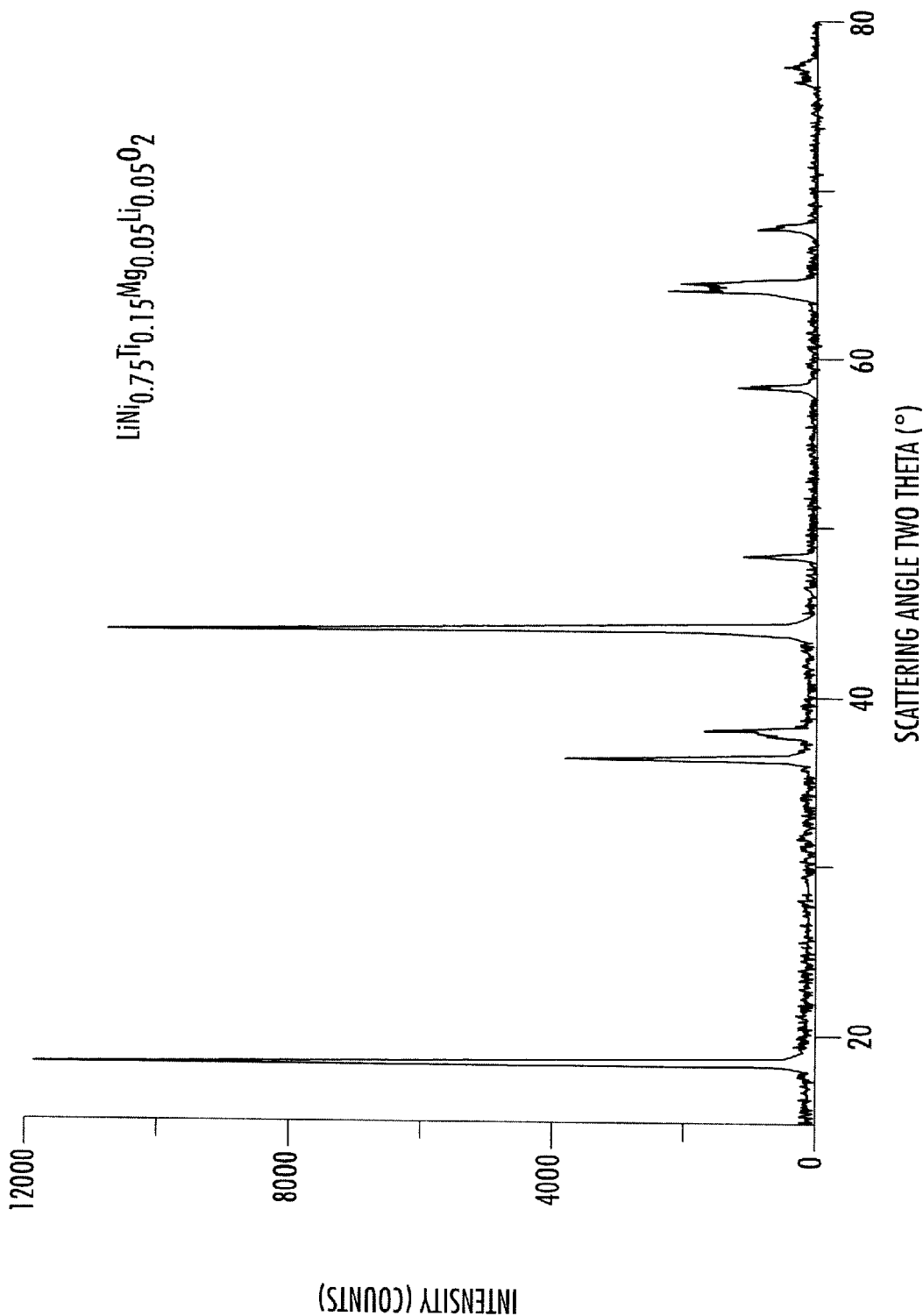
FIG. 9 is an x-ray diffraction pattern for an intercalation compound produced according to another preferred embodiment of the present invention.

A doped intercalation compound having the formula $LiNi_{0.75}Ti_{0.15}Mg_{0.05}O_2$ was prepared by firing a stoichiometric mixture of LiOH, NiO, $TiO_2$ and $Mg(OH)_2$ at 800° C. for 20 hours in air, followed by a 1° C./min controlled cooling to 500° C. and natural cooling to room temperature. FIG. 9 illustrates an x-ray diffraction pattern for this compound. As demonstrated in FIG. 9, the intercalation compound was a single phase compound and as evidenced by the peak ratio between the 003 peak and 104 peak, there was no cation mixing in the metal layers. Accordingly, although not wishing to be bound by theory, it is believed that for lithium metal oxides having the formula $LiNi_{1-x}Ti_aMg_bO_2$ (x=a+b), if a>b then deficiencies in Mg can be compensated by excess Li as long as the average oxidation state of the Ti—Mg—Li dopant combination is still maintained at about 3.

EXAMPLE 8

Figure 10:
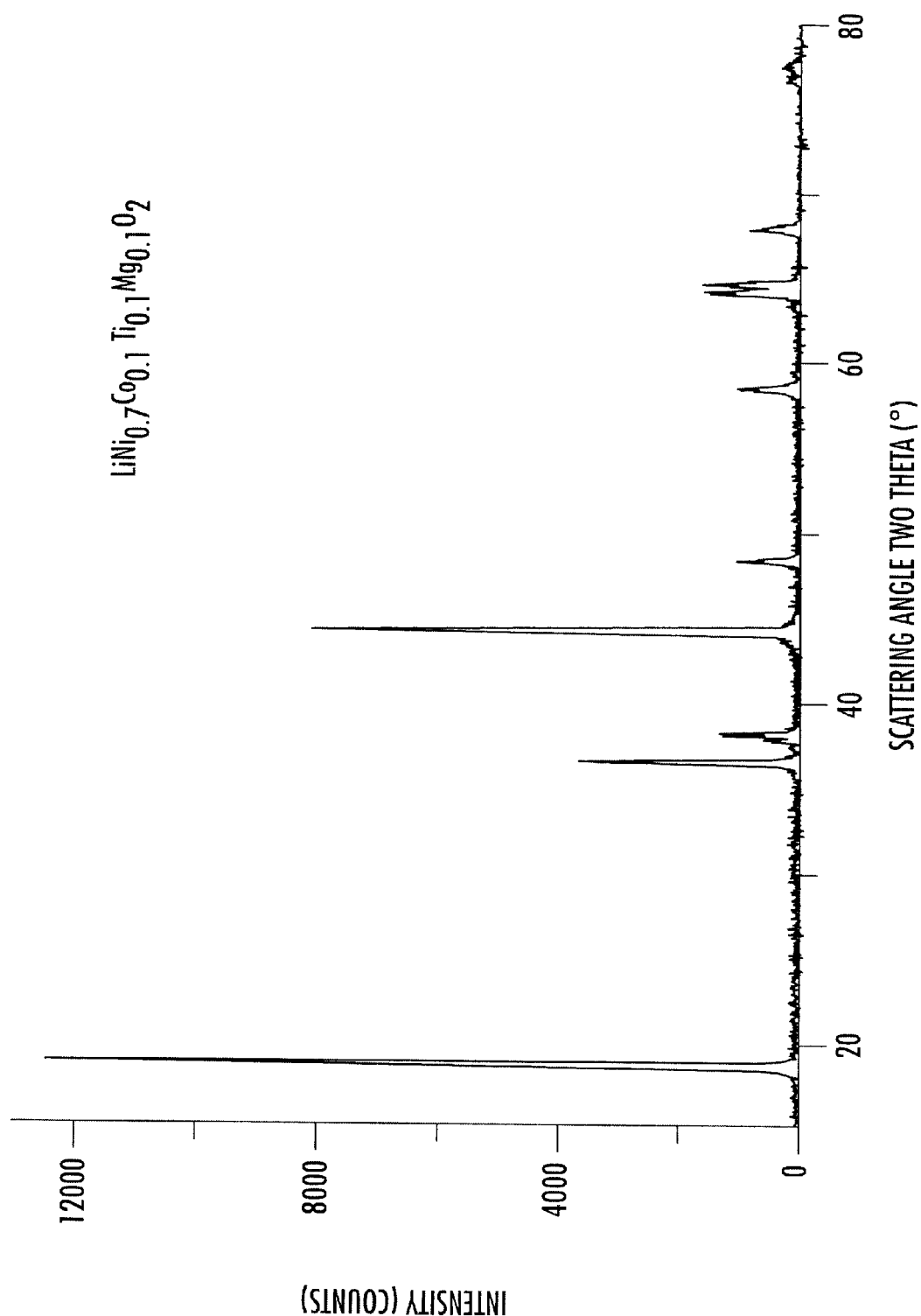
FIG. 10 is a x-ray diffraction pattern for an intercalation compound produced according to yet another preferred embodiment of the present invention.

A doped intercalation compound having the formula $LiNi_{0.7}Co_{0.1}Ti_{0.1}Mg_{0.1}O_2$ was prepared by firing a stoichiometric mixture of LiOH, NiO, $CO_3O_4$, $TiO_2$ and $Mg(OH)_2$ at 800° C. for 20 hours in air, followed by a 1° C./min controlled cooling to 500° C. and natural cooling to room temperature. As shown in FIG. 10, this intercalation compound was predominantly single phase.

As shown in the examples, the doped lithium metal oxide or metal oxide intercalation compounds can be used in the positive electrode (cathode) of lithium or lithium-ion electrochemical cells and are typically combined with a carbonaceous material and a binder polymer to form a cathode. The negative electrode can be lithium metal or alloys, or any material capable of reversibly lithiating and delithiating at an electrochemical potential relative to lithium metal between about 0.0 V and 0.7 V, and is separated from the positive electrode material in the cell using an electronic insulating separator. Examples of negative electrode materials are carbonaceous materials including carbonaceous materials containing H, B, Si and Sn, and tin oxides or tin-silicon oxides. The electrochemical cells further include an electrolyte. The electrolyte can be non-aqueous liquid, gel or solid and preferably comprises a lithium salt. Electrochemical cells using the intercalation compounds of the invention as positive electrode material can be combined for use in large power applications such as for electric vehicles.

In the present invention, a combination of multiple dopants can be selected to replace the transition metal M in intercalation compounds of the formula $LiM_yO_z$ or $M_yO_z$ to achieve the same result as a single dopant. As a result, the limits on the choice of single dopants can be avoided and, at the same time, more beneficial effects can be achieved by using a combination of two or more dopants. Specifically, the use of multiple dopants can result in better specific capacity, cycleability, stability, handling properties and/or cost than has been achieved in single dopant metal oxides. Furthermore, the multiple doped intercalation compounds demonstrate good heat and acid stability and therefore are safe for use as cathode materials in electrochemical cells for lithium and lithium ion batteries.

Many modifications and other embodiments of the invention will come to the mind of one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A doped intercalation compound having the formula:

$$LiCo_{1-x}\{A\}_xO_2, \text{ wherein } 0<x\leq1;$$

$$\{A\} = \sum_{i=1}^{n} w_i B_i$$

wherein $B_i$ is an element used in place of Co and $w_i$ is the fractional amount of element $B_i$ in the total dopant combination such that $$\sum_{i=1}^{n} w_i = 1;$$

n=total number of dopant elements $B_i$ and is a positive integer of two or more;

wherein the fractional amount $w_i$ of dopant element $B_i$ is determined by the following relation:

$$2.5 \le \sum_{i=1}^{n} w_i E_i \le 3.5;$$

wherein $E_i$ is the oxidation state of dopant $B_i$ in the final product $LiCo_{1-x}\{A\}_xO_2$ compound; and wherein the dopant elements $B_i$ include:
- a first dopant selected from Ti, Zr, and combinations thereof; and
- a second dopant selected from Mg, Ca, Sr, Ba, and combinations thereof.

2. The doped intercalation compound according to claim 1, wherein the dopant elements $B_i$ include $Ti^{4+}$ and $Mg^{2+}$.

3. An intercalation compound having the formula $LiCo_{1-x}Ni_yM_aM'_bO_2$; wherein M is selected from Ti, Zr, and combinations thereof; M' is selected from Mg, Ca, Sr, Ba, and combinations thereof; x=y+a+b; x is from greater than 0 to about 0.5; y is from greater than 0 to about 0.5; a is from greater than 0 to about 0.125; and b is from greater than 0 to about 0.125.

4. The intercalation compound according to claim 3, wherein M is $Ti^{4+}$.

5. The intercalation compound according to claim 3, wherein M' is $Mg^{2+}$.

6. The intercalation compound according to claim 3, wherein a is approximately equal to b.

7. The intercalation compound according to claim 3, wherein b is no smaller than a.

8. The intercalation compound according to claim 3, wherein M is $Ti^{4+}$, M' is $Mg^{2+}$, and a is approximately equal to b.

* * * * *